(12) United States Patent
Osawa (10) Patent No.: US 9,756,340 B2
(45) Date of Patent: Sep. 5, 2017

(54) VIDEO ENCODING DEVICE AND VIDEO ENCODING METHOD

(71) Applicant: Mitsubishi Electric Corporation, Tokyo (JP)

(72) Inventor: Atsumasa Osawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 15/108,982

(22) PCT Filed: Feb. 2, 2015

(86) PCT No.: PCT/JP2015/052856
§ 371 (c)(1),
(2) Date: Jun. 29, 2016

(87) PCT Pub. No.: WO2015/115645
PCT Pub. Date: Aug. 6, 2015

(65) Prior Publication Data
US 2017/0006290 A1 Jan. 5, 2017

(30) Foreign Application Priority Data

Feb. 3, 2014 (JP) .................................. 2014-018448

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/117* (2014.11); *H04N 19/137* (2014.11);
(Continued)

(58) Field of Classification Search
CPC .. H04N 19/159; H04N 19/176; H04N 19/117; H04N 19/189; H04N 19/82; H04N 19/137
See application file for complete search history.

(56) References Cited

U.S. PATENT DOCUMENTS

2011/0305274 A1 12/2011 Fu et al.
2013/0182759 A1* 7/2013 Kim ...................... H04N 19/82
375/240.02
(Continued)

FOREIGN PATENT DOCUMENTS

JP 9-298753 A 11/1997
JP 2013-62767 A 4/2013
(Continued)

OTHER PUBLICATIONS

"Series H: Audiovisual and Multimedia Systems, Infrastructure of audiovisual services—Coding of moving video", ITU-T Recommendation H.265, Apr. 2013, pp. 1-317.
(Continued)

*Primary Examiner* — Nam Pham
(74) *Attorney, Agent, or Firm* — Birch, Stewart, Kolasch & Birch, LLP (57) ABSTRACT

Disclosed is a video encoding device including an arithmetic contents determining unit that takes into consideration the arithmetic contents of an SAO arithmetic operation performed on a local decoded image of an already-encoded block pointed to by a motion vector which is searched for through a motion-compensated prediction process performed by a motion-compensated prediction unit, to determine the arithmetic contents of an SAO arithmetic operation to be performed on a local decoded image after a deblocking filter process performed by a deblocking filter unit.

6 Claims, 3 Drawing Sheets

(51) Int. Cl.
*H04N 19/117* (2014.01)
*H04N 19/137* (2014.01)
*H04N 19/189* (2014.01)
*H04N 19/82* (2014.01)

(52) U.S. Cl.
CPC ......... *H04N 19/176* (2014.11); *H04N 19/189* (2014.11); *H04N 19/82* (2014.11)

(56) References Cited

U.S. PATENT DOCUMENTS

2014/0044369 A1  2/2014  Sekiguchi et al.
2014/0192891 A1  7/2014  Alshina et al.

FOREIGN PATENT DOCUMENTS

| JP | 2013-541918 A | 11/2013 |
| JP | 2015-76866 A | 4/2015 |
| WO | WO 2013/001727 A1 | 1/2013 |
| WO | WO 2013/002554 A2 | 1/2013 |
| WO | WO 2014-005305 A1 | 1/2014 |

OTHER PUBLICATIONS

Joo et al., "Fast Sample Adaptive Offset Encoding Algorithm for HEVC based on Intra Prediction Mode", IEEE Third International Conference of Consumer Electronics—Berlin (ICCE-Berlln), Sep. 9, 2013, pp. 50-53.

* cited by examiner

VIDEO ENCODING DEVICE AND VIDEO ENCODING METHOD

FIELD OF THE INVENTION

The present invention relates to a video encoding device for and a video encoding method of performing encoding on a video with a high degree of efficiency.

BACKGROUND OF THE INVENTION

In a video encoding device, it is general to apply a deblocking filter to a local decoded image in order to compensate for a coding distortion in the local decoded image, while in order to reduce mosquito noise which cannot be compensated for by simply applying the deblocking filter, there is a case of applying an SAO arithmetic operation, which is a sample adaptive offset, to the local decoded image. The arithmetic contents of the SAO arithmetic operation are determined from the type of SAO (e.g., an edge offset or a band offset) and an offset value.

In the following nonpatent reference 1, a video encoding device that, when determining the type of SAO and the offset value, in order to provide an improvement in the image quality and the coding efficiency, compares an original image with an image after the SAO arithmetic operation on the basis of the concept of RDO (Rate-Distortion Optimization), to select the type of SAO and the offset value which provide the highest similarity between the original image and the image after the SAO arithmetic operation is disclosed.

RELATED ART DOCUMENT

Nonpatent Reference

Nonpatent reference 1: ITU-T Recommendation H.265

SUMMARY OF THE INVENTION

Problems to be Solved by the Invention

Because the conventional video encoding device is configured as above, when the type of SAO and the offset value are determined, the original image is compared with the image after the SAO arithmetic operation on the basis of the concept of RDO. A problem is however that because the hardware scale becomes large and it takes much operation time in the image comparison based on the concept of RDO, it becomes unable to select an optimal type of SAO and an optimal offset value in real time.

The present invention is made in order to solve the above-mentioned problem, and it is therefore an object of the present invention to provide a video encoding device and a video encoding method capable of achieving downsizing of the hardware scale, and also determining optimal arithmetic contents of an SAO arithmetic operation in real time.

Means for Solving the Problem

According to the present invention, there is provided a video encoding device including: a frame memory to hold a local decoded image of an already-encoded block; a prediction image generator to perform a motion-compensated prediction process on a coding target block by using the local decoded image held by the frame memory, to generate a prediction image of the coding target block; an encoder to compress a difference image between the coding target block and the prediction image, and encode compressed data about the difference image; and a local decoded image generator to decompress the compressed data and decode the difference image, and generate a local decoded image from the decoded difference image and the prediction image, in which an arithmetic contents determinator takes into consideration the arithmetic contents of an SAO arithmetic operation performed on the local decoded image of an already-encoded block pointed to by a motion vector which is searched for through the motion-compensated prediction process performed by the prediction image generator, to determine the arithmetic contents of an SAO arithmetic operation to be performed on the local decoded image generated by the local decoded image generator; and an SAO arithmetic operator performs an SAO arithmetic operation according to the arithmetic contents determined by the arithmetic contents determinator on the local decoded image generated by the local decoded image generator, and stores the local decoded image after the SAO arithmetic operation in the frame memory.

Advantages of the Invention

Because the video encoding device according to the present invention is configured in such a way that the video encoding device includes the arithmetic contents determinator that takes into consideration the arithmetic contents of the SAO arithmetic operation performed on the local decoded image of the already-encoded block shown by the motion vector which is searched for through the motion-compensated prediction process performed by the prediction image generator, to determine the arithmetic contents of the SAO arithmetic operation to be performed on the local decoded image generated by the local decoded image generator, and the SAO arithmetic operator performs the SAO arithmetic operation according to the arithmetic contents determined by the arithmetic contents determinator on the local decoded image generated by the local decoded image generator, downsizing of the hardware scale can be achieved, and optimal arithmetic contents of the SAO arithmetic operation can also be determined in real time.

EMBODIMENTS OF THE INVENTION

Hereafter, in order to explain this invention in greater detail, the preferred embodiments of the present invention will be described with reference to the accompanying drawings.

Embodiment 1

Figure 1:
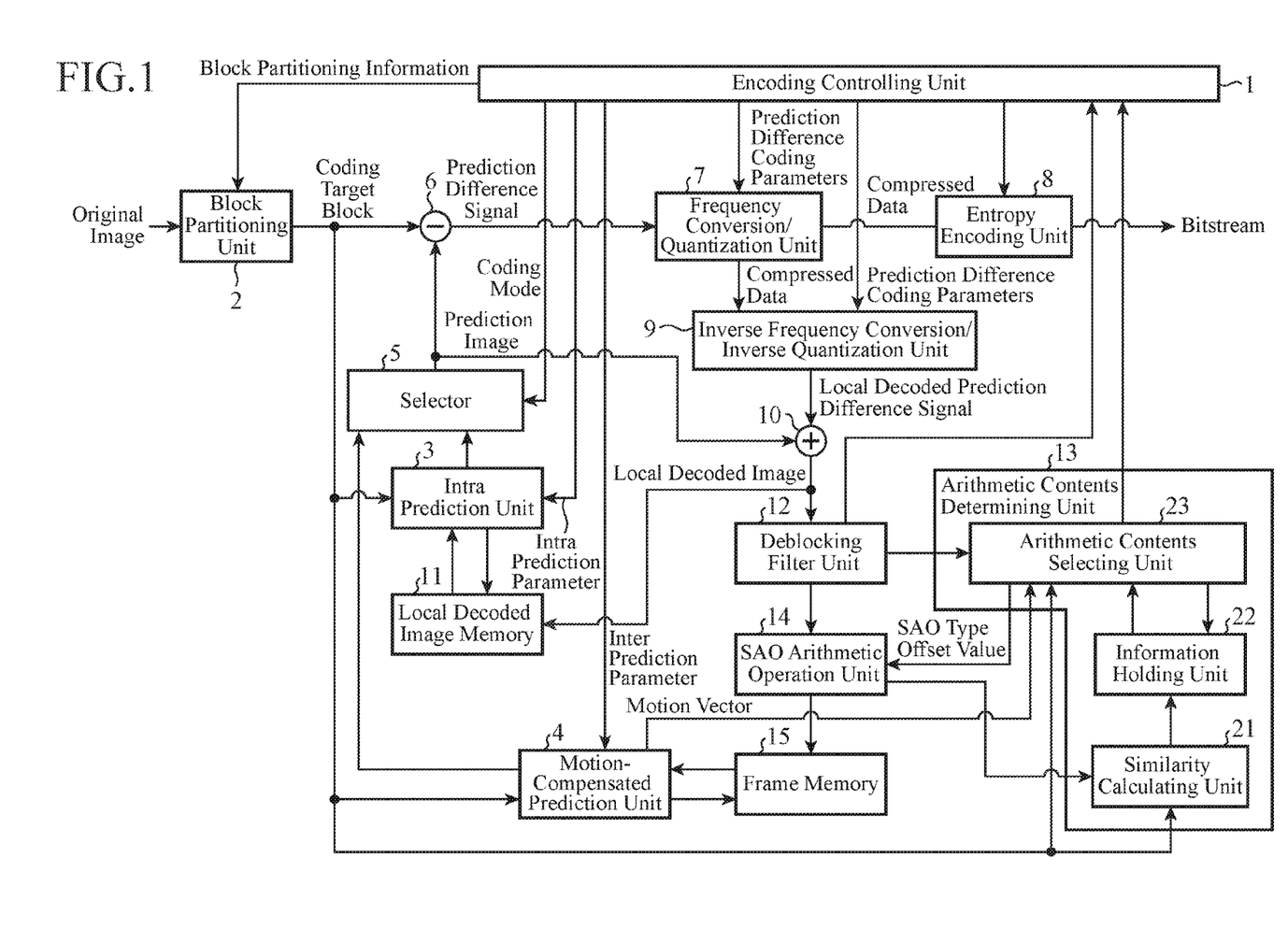
FIG. 1 is a block diagram showing a video encoding device according to Embodiment 1 of the present invention.

FIG. 1 is a block diagram showing a video encoding device according to Embodiment 1 of the present invention.

Referring to FIG. 1, an encoding controlling unit 1 performs a process of determining the largest size of coding target blocks each serving as a unit to be processed when an encoding process is performed, and also determining the size of each coding target block by determining an upper limit on the number of hierarchical layers at the time when each coding target block having the largest size is hierarchically partitioned.

The encoding controlling unit 1 also performs a process of selecting a coding mode which is applied to a coding target block outputted from a block partitioning unit 2, from among one or more selectable coding modes (e.g., one or more intra coding modes in which the size or the like of a prediction block which represents a unit for prediction process differs or one or more inter coding modes in which the size or the like of a prediction block differs).

As an example of a selecting method, there is a method of selecting a coding mode which provides the highest degree of coding efficiency for the coding target block outputted from the block partitioning unit 2, from among the one or more selectable coding modes.

The encoding controlling unit 1 also performs a process of, when the coding mode having the highest degree of coding efficiency is an intra coding mode, determining an intra prediction parameter to be used when performing an intra prediction process on the coding target block in the intra coding mode, for each prediction block which is a unit for prediction process shown by the above-described intra coding mode, and, when the coding mode having the highest degree of coding efficiency is an inter coding mode, determining an inter prediction parameter to be used when performing an inter prediction process on the coding target block in the inter coding mode, for each prediction block which is a unit for prediction process shown by the above-described inter coding mode.

The encoding controlling unit 1 further performs a process of determining prediction difference coding parameters which the encoding controlling unit provides for a frequency conversion/quantization unit 7 and an inverse frequency conversion/inverse quantization unit 9. The prediction difference coding parameters include transformation block partitioning information showing partitioning information about transformation blocks each serving as a unit for orthogonal transformation process on the coding target block and a quantization parameter defining a quantization step size at the time when performing quantization on transform coefficients, etc.

The block partitioning unit 2 performs a process of, every time when receiving an original image, partitioning the original image into largest coding target blocks which are coding target blocks each having the largest size determined by the encoding controlling unit 1, and also partitioning each of the largest coding target blocks into coding target blocks hierarchically until the number of hierarchical layers reaches the upper limit determined by the encoding controlling unit 1.

More specifically, the block partitioning unit 2 performs a process of partitioning the original image into coding target blocks each having the size determined by the encoding controlling unit 1, and sequentially outputting each of the coding target blocks. Each of the coding target blocks is partitioned into one or more prediction blocks each serving as a unit for prediction process.

An intra prediction unit 3 performs, when an intra coding mode is selected, as the coding mode associated with the coding target block outputted from the block partitioning unit 2, by the encoding controlling unit 1, an intra prediction process (intra-frame prediction process) using the intra prediction parameter determined by the encoding controlling unit 1 while referring to a local decoded image stored in a local decoded image memory 11, and then performs a process of generating an intra prediction image of the coding target block.

A motion-compensated prediction unit 4 performs, when an inter coding mode is selected, as the coding mode associated with the coding target block outputted from the block partitioning unit 2, by the encoding controlling unit 1, a process of comparing the coding target block with one or more frames of local decoded images stored in a frame memory 15 to search for a motion vector, performs an inter prediction process (motion-compensated prediction process) on the coding target block by using the motion vector and the inter prediction parameter determined by the encoding controlling unit 1, and performs a process of generating an inter prediction image of the coding target block. The motion-compensated prediction unit 4 constructs a prediction image generator.

A selector 5 performs a process of, when the coding mode determined by the encoding controlling unit 1 is an intra coding mode, outputting the intra prediction image generated by the intra prediction unit 3 to a subtracting unit 6 and an adding unit 10, whereas when the coding mode determined by the encoding controlling unit 1 is an inter coding mode, outputting the inter prediction image generated by the motion-compensated prediction unit 4 to the subtracting unit 6 and the adding unit 10.

The subtracting unit 6 performs a process of subtracting the intra prediction image generated by the intra prediction unit 3 or the inter prediction image generated by the motion-compensated prediction unit 4 from the coding target block outputted from the block partitioning unit 2, and outputting a prediction difference signal showing a difference image which is the result of the subtraction to the frequency conversion/quantization unit 7.

The frequency conversion/quantization unit 7 refers to the transformation block partitioning information included in the prediction difference coding parameters determined by the encoding controlling unit 1 and performs an orthogonal transformation process (e.g., an orthogonal transformation process, such as DCT (discrete cosine transform), DST (discrete sine transform), or KL transform in which bases are designed for specific learning sequence in advance) on the prediction difference signal outputted from the subtracting unit 6 on a per transformation block basis to calculate transform coefficients, and also refers to the quantization parameter included in the prediction difference coding parameters and performs a process of quantizing the transform coefficients of each transformation block and then outputting compressed data which are the transform coefficients quantized thereby to an entropy encoding unit 8 and the inverse frequency conversion/inverse quantization unit 9.

The entropy encoding unit 8 performs a process of variable-length-encoding the compressed data outputted from the frequency conversion/quantization unit 7, the output signal from the encoding controlling unit 1 (the block partitioning information about the inside of each largest coding target block, the coding mode, the prediction difference coding parameters, the intra prediction parameter and the inter prediction parameter), and the motion vector outputted from the motion-compensated prediction unit 4 (when the coding mode is an inter coding mode), to generate a bitstream which consists of encoded data about those data.

An encoder is comprised of the subtracting unit 6, the frequency conversion/quantization unit 7 and the entropy encoding unit 8.

The inverse frequency conversion/inverse quantization unit 9 refers to the quantization parameter and the transformation block partitioning information included in the prediction difference coding parameters determined by the encoding controlling unit 1 and inverse-quantizes the compressed data outputted from the frequency conversion/quantization unit 7 on a per transformation block, and also performs an inverse orthogonal transformation process on the transform coefficients which are the compressed data inverse-quantized thereby and performs a process of calculating a local decoded prediction difference signal corresponding to the prediction difference signal outputted from the subtracting unit 6.

The adding unit 10 performs a process of adding the local decoded prediction difference signal calculated by the inverse frequency conversion/inverse quantization unit 9 and either the intra prediction image generated by the intra prediction unit 3 or the inter prediction image generated by the motion-compensated prediction unit 4, to calculate a local decoded image corresponding to the coding target block outputted from the block partitioning unit 2.

A local decoded image generator is comprised of the inverse frequency conversion/inverse quantization unit 9 and the adding unit 10.

The local decoded image memory 11 is a recording medium that stores the local decoded image calculated by the adding unit 10.

A deblocking filter unit 12 performs a deblocking filter process of reducing a distortion occurring at a boundary between transformation blocks and a distortion occurring at a boundary between prediction blocks on the local decoded image calculated by the adding unit 10.

An arithmetic contents determining unit 13 performs a process of taking into consideration the arithmetic contents of the SAO arithmetic operation performed on the local decoded image of the already-encoded block pointed to by the motion vector which is searched for through the motion-compensated prediction process performed by the motion-compensated prediction unit 4, and determines the arithmetic contents (the type of SAO and the offset value) of an SAO arithmetic operation to be performed on the local decoded image after the deblocking filter process performed by the deblocking filter unit 12. The arithmetic contents determining unit 13 constructs an arithmetic contents determinator.

An SAO arithmetic operation unit 14 performs a process of implementing an SAO arithmetic operation according to the arithmetic contents determined by the arithmetic contents determining unit 13 on the local decoded image after the deblocking filter process performed by the deblocking filter unit 12, and storing the local decoded image after the SAO arithmetic operation in the frame memory 15. The SAO arithmetic operation unit 14 constructs an SAO arithmetic operator.

A similarity calculating unit 21 of the arithmetic contents determining unit 13 performs a process of calculating the degree of similarity between the coding target block outputted from the block partitioning unit 2 and the local decoded image after the SAO arithmetic operation performed by the SAO arithmetic operation unit 14.

An information holding unit 22 is a memory that, when the encoding of the coding target block outputted from the block partitioning unit 2 is performed, holds, as information about the already-encoded block which is the coding target block after being encoded, both the degree of similarity calculated by the similarity calculating unit 21 and the arithmetic contents (the type of SAO and the offset value) of the SAO arithmetic operation performed by the SAO arithmetic operation unit 14.

An arithmetic contents selecting unit 23 performs a weighting process of acquiring the information (the degree of similarity and the arithmetic contents of the SAO arithmetic operation) about the already-encoded block pointed to by the motion vector which is searched for through the motion-compensated prediction process performed by the motion-compensated prediction unit 4 from the information about already-encoded blocks held by the information holding unit 22 and changing the degree of easiness that the acquired arithmetic contents are selected, according to the acquired degree of similarity, and, after that, performs a process of selecting the arithmetic contents (the type of SAO and the offset value) of an SAO arithmetic operation to be performed on the local decoded image after the deblocking filter process performed by the deblocking filter unit 12 from among a plurality of arithmetic contents which are prepared in advance.

In the example shown in FIG. 1, although it is assumed that the encoding controlling unit 1, the block partitioning unit 2, the intra prediction unit 3, the motion-compensated prediction unit 4, the selector 5, the subtracting unit 6, the frequency conversion/quantization unit 7, the entropy encoding unit 8, the inverse frequency conversion/inverse quantization unit 9, the adding unit 10, the local decoded image memory 11, the deblocking filter unit 12, the arithmetic contents determining unit 13, the SAO arithmetic operation unit 14 and the frame memory 15, which are the components of the video encoding device, consist of pieces of hardware for exclusive use (each of the components other than the local decoded image memory 11 and the frame memory 15 consists of, for example, a semiconductor integrated circuit equipped with a CPU, a one chip microcomputer, or the like), respectively, the video encoding device can alternatively consist of a computer.

In the case in which the video encoding device consists of a computer, the local decoded image memory 11 and the frame memory 15 can be constructed on a memory of the computer, a program in which the details of the processes performed by the encoding controlling unit 1, the block partitioning unit 2, the intra prediction unit 3, the motion-compensated prediction unit 4, the selector 5, the subtractor 6, the frequency conversion/quantization unit 7, the entropy encoding unit 8, the inverse frequency conversion/inverse quantization unit 9, the adding unit 10, the deblocking filter unit 12, the arithmetic contents determining unit 13 and the SAO arithmetic operation unit 14 are described can be stored in a memory of the computer, and a CPU of the computer can be made to execute the program stored in the memory.

Figure 2:
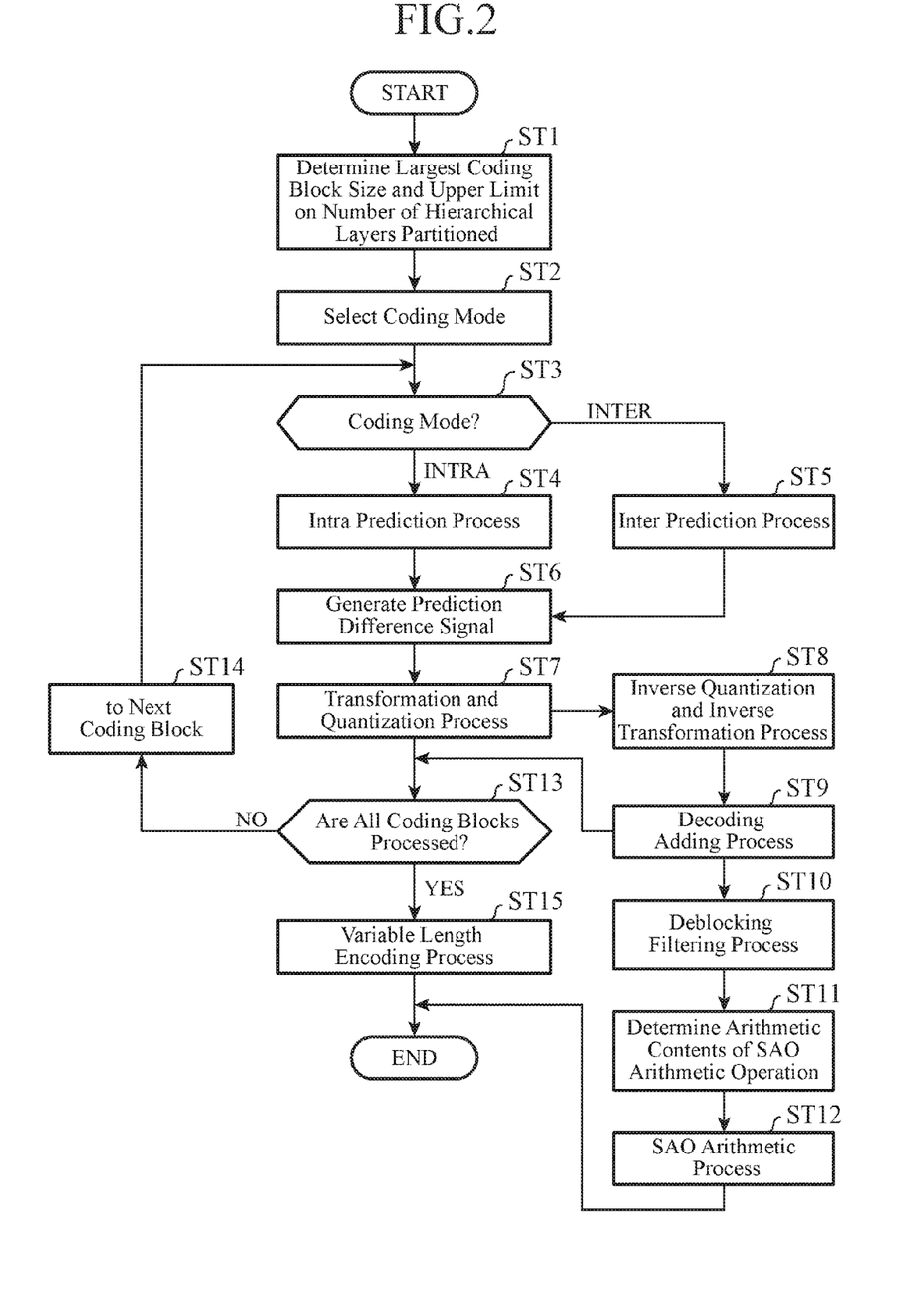
FIG. 2 is a flow chart showing processing (video encoding method) performed by the video encoding device according to Embodiment 1 of the present invention.

FIG. 2 is a flow chart showing the processing (video encoding method) performed by the video encoding device according to Embodiment 1 of the present invention.

Figure 3:
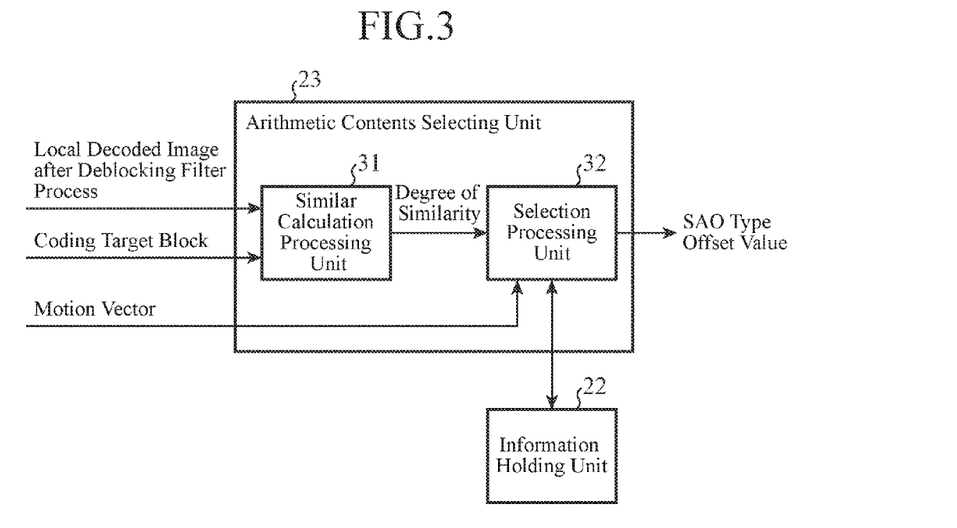
FIG. 3 is a block diagram showing the inside of an arithmetic contents selecting unit 23 of the video encoding device according to Embodiment 1 of the present invention.

FIG. 3 is a block diagram showing the inside of the arithmetic contents selecting unit 23 of the video encoding device according to Embodiment 1 of the present invention.

Referring to FIG. 3, the similarity calculation processing unit 31 performs a process of generating local decoded images after the SAO arithmetic operation, respectively, the SAO arithmetic operation being performed on the local decoded image after the deblocking filter process performed by the deblocking filter unit 12 according to the plurality of arithmetic contents which are prepared in advance, and calculating the degrees of similarity between the local decoded images after the SAO arithmetic operation and the coding target block outputted from the block partitioning unit 2, respectively.

The selection processing unit 32 performs a process of weighting each of the degrees of similarity calculated by the similarity calculation processing unit 31 by using the degree of similarity which is information about the already-encoded block pointed to by the motion vector outputted from the motion-compensated prediction unit 4, and selecting the arithmetic contents corresponding to the highest degree of similarity from among the plurality of arithmetic contents respectively corresponding to the degrees of similarity on which the weighting is performed.

Next, operations will be explained.

The video encoding device shown in FIG. 1 is characterized in that the video encoding device is adapted for local changes of a video signal (original image) in a space direction and in a time direction, partitions the video signal into blocks having various sizes, and performs intra-frame and inter-frame adaptive encoding.

In general, video signals have characteristics of their complexity locally varying in space and time. From the viewpoint of space, a certain video frame may have, for example, a pattern having a uniform signal characteristic in a relatively large image region, such as a sky image or a wall image, or a pattern in which a pattern having a complicated texture in a small image region, such as a person image or a picture including a fine texture, also coexists.

Also from the viewpoint of time, a sky image and a wall image have a small local change in a time direction in their patterns, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is performed in the encoding process, the code amount of parameters used for the prediction can be reduced as long as the parameters can be applied uniformly to as large an image signal region as possible.

On the other hand, because the amount of errors occurring in the prediction increases when the same prediction parameter is applied to a large image region in an image signal pattern having a large change in time and space, the code amount of the prediction difference signal increases.

Therefore, it is desirable that, for an image region having a large change in time and space, the block size of a block subjected to the prediction process to which the same prediction parameter is applied is reduced, thereby increasing the data volume of the parameter which is used for the prediction and reducing the electric power and entropy of the prediction difference signal.

In this Embodiment 1, in order to perform encoding which is adapted for the above-described general characteristics of a video signal, a configuration is employed in which the prediction process and so on are started first from a predetermined largest block size, the region of the video signal is hierarchically partitioned, and the prediction process and the encoding process on the prediction difference are adapted for each of the partitioned regions.

First, the encoding controlling unit 1 determines the size of each largest coding target block which is used for the encoding of a picture (current picture) which is the target to be encoded, and an upper limit on the number of hierarchical layers into which each largest coding target block is hierarchically partitioned (step ST1 of FIG. 2).

As a method of determining the size of each largest coding target block, for example, there can be a method of determining the same size for all the pictures according to the resolution of the video signal of the inputted image, and a method of quantifying a variation in the complexity of a local movement of the video signal of the inputted image as a parameter and then determining a small size for a picture having a vigorous movement while determining a large size for a picture having a small movement.

As a method of determining the upper limit on the number of hierarchical layers partitioned, for example, there can be a method of determining the same number of hierarchical layers for all the pictures according to the resolution of the video signal of the inputted image, and a method of determining an increased number of hierarchical layers so that a finer movement can be detected when the video signal of the inputted image has a vigorous movement, while determining a decreased number of hierarchical layers when the video signal of the inputted image has a small movement.

The above-described size of each largest coding target block and the upper limit on the number of hierarchical layers into which each largest coding target block is hierarchically partitioned are encoded into the sequence level header or the like. In that case, instead of the upper limit on the number of hierarchical layers partitioned, the smallest block size of coding target blocks can be encoded.

The encoding controlling unit 1 further selects a coding mode corresponding to each of the coding target blocks into which the inputted image is hierarchically partitioned from one or more available coding modes (step ST2).

More specifically, the encoding controlling unit 1 hierarchically partitions each image region having the largest coding target block size into coding target blocks each having a coding target block size until the number of hierarchical layers partitioned reaches the upper limit which is determined in advance, and determines a coding mode for each of the coding target blocks.

The coding mode is one of one or more intra coding modes (generically referred to as "INTRA") and one or more inter coding modes (generically referred to as "INTER"), and the encoding controlling unit 1 selects a coding mode corresponding to each of the coding target blocks from among all the coding modes available in the picture currently being processed or a subset of the coding modes.

Each of the coding target blocks into which each inputted image is hierarchically partitioned by the block partitioning unit 2, which will be mentioned later, is further partitioned into one or more prediction blocks each of which is a unit on which a prediction process is to be performed, and the state of the partitioning into the prediction blocks is also included as information in the coding mode. More specifically, the coding mode, which is either an intra or inter coding mode, is an index identifying what type of partitioned prediction blocks are included.

Although a detailed explanation of a method of selecting a coding mode for use in the encoding controlling unit 1 will be omitted hereafter because the selecting method is a known technique, for example, there is a method of performing an encoding process on each coding target block by using arbitrary available coding modes to examine the coding efficiency, and selecting a coding mode having the highest degree of coding efficiency from among the plurality of available coding modes.

When each coding target block is further partitioned into prediction blocks on each of which the prediction process is to be performed, a prediction parameter (intra prediction parameter or inter prediction parameter) is determined for each of the prediction blocks.

The encoding controlling unit 1 further determines the quantization parameter and the transformation block partitioning state, which are used when the difference image is compressed, for each coding target block.

After determining the size of each largest coding target block and the upper limit on the number of hierarchical layers into which each largest coding target block is hierarchically partitioned in the above-mentioned way, the encoding controlling unit 1 outputs the block partitioning information showing the size of each largest coding target block and the upper limit on the number of hierarchical layers to the block partitioning unit 2.

The encoding controlling unit 1 also outputs the prediction difference coding parameters including the transformation block partitioning information showing the partitioning information about the transformation blocks in each coding target block, and the quantization parameter defining the quantization step size at the time of performing quantization on the transform coefficients to the frequency conversion/quantization unit 7, the entropy encoding unit 8 and the inverse frequency conversion/inverse quantization unit 9. Because this process of determining the prediction difference coding parameters is a known technique, a detailed explanation of the process will be omitted hereafter.

In addition, when selecting an intra coding mode as the coding mode for the coding target block and determining the intra prediction parameter in the above-mentioned way, the encoding controlling unit 1 outputs the intra prediction parameter to the intra prediction unit 3.

When selecting an inter coding mode as the coding mode for the coding target block and determining the inter prediction parameter, the encoding controlling unit 1 outputs the inter prediction parameter to the motion-compensated prediction unit 4.

Every time an original image is inputted, the block partitioning unit 2 partitions the original image into largest coding target blocks each of which is a coding target block having the largest size shown by the block partitioning information outputted from the encoding controlling unit 1 and also partitions each of the largest coding target blocks into coding target blocks hierarchically until the number of hierarchical layers reaches the upper limit shown by the block partitioning information.

More specifically, the block partitioning unit 2 partitions the inputted original image into coding target blocks each having the size determined by the encoding controlling unit 1, and sequentially outputs each of the coding target blocks. Each of the coding target blocks is partitioned into one or more prediction blocks each serving as a unit for prediction process.

When receiving a coding target block from the block partitioning unit 2, the intra prediction unit 3 performs an intra prediction process on each prediction block in the coding target block by using the intra prediction parameter determined by the encoding controlling unit 1 while referring to the local decoded image stored in the local decoded image memory 11, to generate an intra prediction image (step ST4) when the coding mode determined by the encoding controlling unit 1 is an intra coding mode (step ST3).

Because a video decoding device not illustrated needs to generate an intra prediction which is completely the same as that intra prediction image, the intra prediction parameter used for the generation of the intra prediction image is outputted from the encoding controlling unit 1 to the entropy encoding unit 8 and is multiplexed into the bitstream.

When receiving a coding target block from the block partitioning unit 2, the motion-compensated prediction unit 4 compares each prediction block in the coding target block with the local decoded images of already-encoded blocks stored in the frame memory 15, to search for a motion vector when the coding mode determined by the encoding controlling unit 1 is an inter coding mode (step ST3).

Because the process of searching for a motion vector is a known technique, a detailed explanation of the process will be omitted hereafter. After searching for a motion vector, the motion-compensated prediction unit 4 performs an inter prediction process on each prediction block in the coding target block by using the motion vector and the inter prediction parameter determined by the encoding controlling unit 1, to generate an inter prediction image (step ST5).

Because the video decoding device not illustrated needs to generate an inter prediction which is completely the same as that inter prediction image, the inter prediction parameter used for the generation of the inter prediction image is outputted from the encoding controlling unit 1 to the entropy encoding unit 8 and is multiplexed into the bitstream.

The motion vector which is searched for by the motion-compensated prediction unit 4 is also outputted to the entropy encoding unit 8 and is multiplexed into the bitstream.

When the coding mode determined by the encoding controlling unit 1 is an intra coding mode, the selector 5 outputs the intra prediction image generated by the intra prediction unit 3 to the subtracting unit 6 and the adding unit 10, whereas when the coding mode determined by the encoding controlling unit 1 is an inter coding mode, the selector outputs the inter prediction image generated by the motion-compensated prediction unit 4 to the subtracting unit 6 and the adding unit 10.

When receiving the intra prediction image generated by the intra prediction unit 3 from the selector 5, the subtracting unit 6 subtracts that intra prediction image from the prediction block in the coding target block outputted from the block partitioning unit 2, and outputs a prediction difference signal showing the difference image which is the result of the subtraction to the frequency conversion/quantization unit 7 (step ST6).

In contrast, when receiving the inter prediction image generated by the motion-compensated predicting unit 4 from the selector 5, the subtracting unit 6 subtracts that inter prediction image from the prediction block in the coding target block outputted from the block partitioning unit 2, and outputs a prediction difference signal showing the difference image which is the result of the subtraction to the frequency conversion/quantization unit 7 (step ST6).

When receiving the prediction difference signal from the subtracting unit 6, the frequency conversion/quantization unit 7 refers to the transformation block partitioning information included in the prediction difference coding parameters determined by the encoding controlling unit 1, and performs an orthogonal transformation process (e.g., an orthogonal transformation process, such as a DCT (discrete cosine transform), a DST (discrete sine transform), or a KL transform in which bases are designed for a specific learning sequence in advance) on the prediction difference signal on a per transformation block basis, to calculate transform coefficients.

The frequency conversion/quantization unit 7 also refers to the quantization parameter included in the prediction difference coding parameters and quantizes the transform coefficients of each transformation block, and outputs compressed data which are the transform coefficients quantized thereby to the entropy encoding unit 8 and the inverse frequency conversion/inverse quantization unit 9 (step ST7).

When receiving the compressed data from the frequency conversion/quantization unit 7, the inverse frequency conversion/inverse quantization unit 9 refers to the quantization parameter and the transformation block partitioning information which are included in the prediction difference coding parameters determined by the encoding controlling unit 1, and inverse-quantizes the compressed data on a per transformation block basis.

The inverse frequency conversion/inverse quantization unit 9 also performs an inverse orthogonal transformation process (e.g., an inverse DCT, an inverse DST, an inverse KL transform, or the like) on the transform coefficients, which are the compressed data inverse-quantized, on a per transformation block basis, and calculates a local decoded prediction difference signal corresponding to the prediction difference signal outputted from the subtracting unit 6 and outputs the local decoded prediction difference signal to the adding unit 10 (step ST8).

When receiving the intra prediction image generated by the intra prediction unit 3 from the selector 5, the adding unit 10 adds the intra prediction image and the local decoded prediction difference signal outputted from the inverse frequency conversion/inverse quantization unit 9, thereby calculating a local decoded image (step ST9).

In contrast, when receiving the inter prediction image generated by the motion-compensated predicting unit 4 from the selector 5, the adding unit 10 adds the inter prediction image and the local decoded prediction difference signal outputted from the inverse frequency conversion/inverse quantization unit 9, thereby calculating a local decoded image (step ST9).

The adding unit 10 outputs the local decoded image to the deblocking filter unit 12 and also stores the local decoded image in the local decoded image memory 11.

This local decoded image serves as an already-encoded image signal which is used at the time of subsequent intra prediction processes.

When receiving the local decoded image from the adding unit 10, the deblocking filter unit 12 performs the deblocking filter process of reducing a distortion occurring at a boundary between transformation blocks and a distortion occurring at a boundary between prediction blocks on the local decoded image, and outputs the local decoded image after the deblocking filter process to the SAO arithmetic operation unit 14 (step ST10).

After the deblocking filter unit 12 performs the deblocking filter process on the local decoded image, the arithmetic contents determining unit 13 specifies the local decoded image of the already-encoded block pointed to by the motion vector which is searched for by the motion-compensated prediction unit 4.

Figure 4:
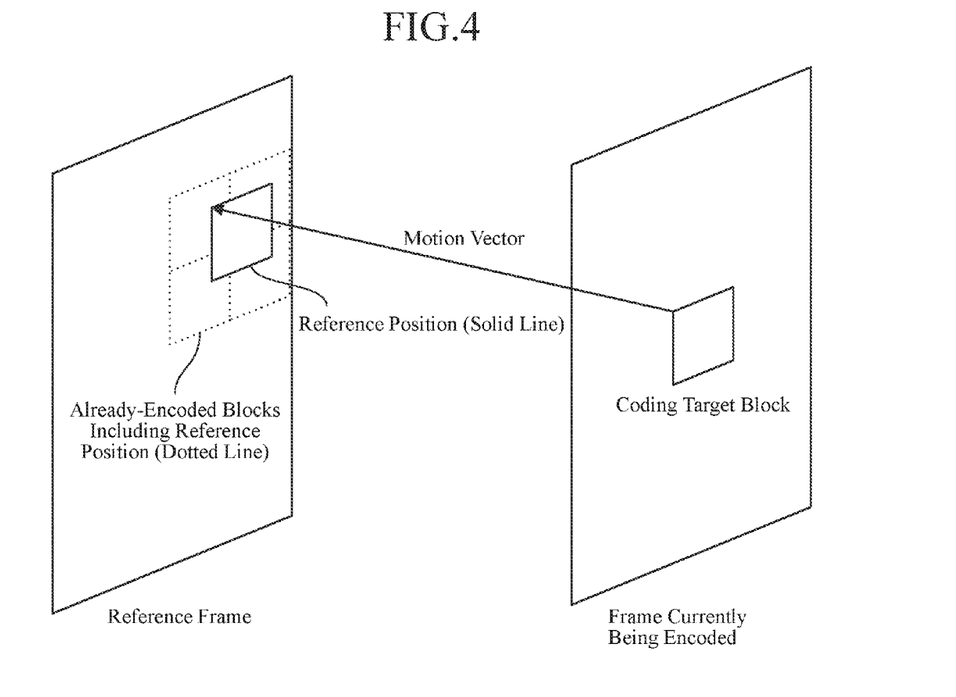
FIG. 4 is an explanatory drawing showing a local decoded image (local decoded image at a reference position) of an already-encoded block pointed to by a motion vector.

FIG. 4 is an explanatory drawing showing the local decoded image of the already-encoded block pointed to by the motion vector (local decoded image at the reference position).

After specifying the local decoded image of the already-encoded block pointed to by the motion vector, the arithmetic contents determining unit 13 takes into consideration the arithmetic contents (the type of SAO and the offset value) of the SAO arithmetic operation performed, in the past, on the local decoded image of the already-encoded block to determine the arithmetic contents (the type of SAO and the offset value) of the SAO arithmetic operation to be performed on the local decoded image after the deblocking filter process performed by the deblocking filter unit 12 (step ST11), as will be described in detail later.

The arithmetic contents (the type of SAO and the offset value) of the SAO arithmetic operation are described in the HEVC standard.

After the arithmetic contents determining unit 13 determines the arithmetic contents (the type of SAO and the offset value) of the SAO arithmetic operation, the SAO arithmetic operation unit 14 performs the SAO arithmetic operation according to the arithmetic contents on the local decoded image after the deblocking filter process performed by the deblocking filter unit 12, and stores the local decoded image after the SAO arithmetic operation in the frame memory 15 (step ST12).

This local decoded image after the SAO arithmetic operation serves as an already-encoded image signal which is used at the time of subsequent inter prediction processes.

The video encoding device repeatedly performs the processes of steps ST3 to ST9 until the video encoding device completes the processing on all the coding target blocks into which the inputted image is partitioned hierarchically, and, when completing the processing on all the coding target blocks, shifts to a process of step ST15 (steps ST13 and ST14).

The entropy encoding unit 8 variable-length-encodes the compressed data outputted from the frequency conversion/quantization unit 7, the output signal from the encoding controlling unit 1 (the block partitioning information about the inside of each largest coding target block, the coding mode, the prediction difference coding parameters, the intra prediction parameter and the inter prediction parameter), and the motion vector outputted from the motion-compensated prediction unit 4 (when the coding mode is an inter coding mode), to generate a bitstream which consists of encoded data about those data (step ST15).

Hereafter, the details of the processing performed by the arithmetic contents determining unit 13 will be explained concretely.

The similarity calculating unit 21 calculates the degree of similarity between the coding target block outputted from the block partitioning unit 2 and the local decoded image after the SAO arithmetic operation performed by the SAO arithmetic operation unit 14 by using, for example, a method of calculating the degree of similarity with a high degree of accuracy, such as sum of squared errors (SSE) or sum of Hadamard absolute transformed differences (SATD).

The higher degree of similarity between the coding target block and the local decoded image after the SAO arithmetic operation, the smaller value the sum of squared errors (SSE) and the sum of Hadamard absolute transformed differences (SATD) have.

Because the degree of similarity calculated by the similarity calculating unit 21 is used when determining the arithmetic contents of the SAO arithmetic operation to be performed on the local decoded image of each coding target block in the next and subsequent frames, and therefore there is sufficient time before the degree of similarity is used, a calculating method having a higher degree of accuracy than a method of calculating a degree of similarity used by the similarity calculation processing unit 31 of the arithmetic contents selecting unit 23, which will be described later, is used.

The degree of similarity calculated by the similarity calculating unit 21 and the arithmetic contents (the type of SAO and the offset value) of the SAO arithmetic operation which is performed on each coding target block in the latest frame by the SAO arithmetic operation unit 14 are stored in the information holding unit 22.

The information holding unit 22 can hold the pieces of information (the degree of similarity and the arithmetic contents of the SAO arithmetic operation) about already-encoded blocks of a plurality of frames each of which has a possibility of being a reference frame.

The arithmetic contents selecting unit 23 specifies the already-encoded block pointed to by the motion vector which is searched for by the motion-compensated prediction unit 4, and acquires the information (the degree of similarity and the arithmetic contents of the SAO arithmetic operation) about the already-encoded block pointed to by the motion vector from the pieces of information about the already-encoded blocks of the plurality of frames held by the information holding unit 22.

After acquiring the information about the already-encoded block (the degree of similarity and the arithmetic contents of the SAO arithmetic operation), the arithmetic contents selecting unit 23 performs the weighting process of changing the degree of easiness that the acquired arithmetic contents are selected, according to the acquired degree of similarity, and, after that, selects the arithmetic contents (the type of SAO and the offset value) of the SAO arithmetic operation to be performed on the local decoded image after the deblocking filter process performed by the deblocking filter unit 12 from the plurality of arithmetic contents which are prepared in advance.

Hereafter, the details of the processing performed by the arithmetic contents selecting unit 23 will be explained concretely.

The similar calculation processing unit 31 of the arithmetic contents selecting unit 23 generates local decoded images after the SAO arithmetic operation when the SAO arithmetic operation on the local decoded image after the deblocking filter process performed by the deblocking filter unit 12 is performed according to the plurality of arithmetic contents (each having a type of SAO and an offset value) which are prepared in advance, respectively.

For example, when an edge offset and a band offset are prepared as types of SAO, and a plurality of offset values corresponding to each offset are prepared, the similar calculation processing unit performs the SAO arithmetic operation on the local decoded image after the deblocking filter process according to a plurality of arithmetic contents which are combinations of one of the types of SAO and one of the offset values, to generate local decoded images after the SAO arithmetic operation, respectively.

After generating, for example, N local decoded images as the local decoded images after the SAO arithmetic operation, the similarity calculation processing unit 31 calculates the degrees of similarity $R_1, R_2, \ldots,$ and $R_N$ between the N local decoded images and the coding target block outputted from the block partitioning unit 2 by using, for example, a simple method of calculating a degree of similarity, such as sum of absolute differences (SAD).

Because it is necessary to perform the process of calculating a degree of similarity in the similarity calculation processing unit 31 in real time, a calculating method which is simpler than the method of calculating a degree of similarity used by the similarity calculating unit 21 is used.

After the similarity calculation processing unit 31 calculates the degrees of similarity $R_1, R_2, \ldots,$ and $R_N$ between the N local decoded images and the coding target block, the selection processing unit 32 of the arithmetic contents selecting unit 23 weights those degrees of similarity $R_1, R_2, \ldots,$ and $R_N$ by the degree of similarity which is information about the already-encoded block pointed to by the motion vector.

More specifically, the selection processing unit 32 specifies the arithmetic contents of the SAO arithmetic operation which are shown by the information about the already-encoded block pointed to by the motion vector from the N arithmetic contents corresponding to the degrees of similarity $R_1, R_2, \ldots,$ and $R_N$. In this embodiment, for convenience of explanation, it is assumed that the arithmetic contents corresponding to the degree of similarity $R_n$ are specified.

When the degree of similarity shown by the information about the already-encoded block pointed to by the motion vector is higher than a threshold Th set in advance, the selection processing unit 32 adds a positive offset to the degree of similarity $R_n$ (increases the degree of similarity $R_n$) in order to make it easy for the arithmetic contents corresponding to the degree of similarity $R_n$ to be selected from the N arithmetic contents corresponding to the degrees of similarity $R_1, R_2, \ldots,$ and $R_N$.

In contrast, when the degree of similarity shown by the information about the already-encoded block pointed to by the motion vector is equal to or lower than the threshold Th, the selection processing unit adds a negative offset to the degree of similarity $R_n$ (decreases the degree of similarity $R_n$) in order to make it hard for the arithmetic contents corresponding to the degree of similarity $R_n$ to be selected from the N arithmetic contents corresponding to the degrees of similarity $R_1, R_2, \ldots,$ and $R_N$.

After weighting the degrees of similarity $R_1, R_2, \ldots,$ and $R_N$ (adding a positive or negative offset to the degree of similarity $R_n$), the selection processing unit 32 specifies the highest degree of similarity from among the weighted degrees of similarity $R_1, R_2, \ldots,$ and $R_N$, and outputs the arithmetic contents corresponding to the highest degree of similarity to the SAO arithmetic operation unit 14 and the information holding unit 22.

For example, when the highest degree of similarity among the weighted degrees of similarity $R_1, R_2, \ldots,$ and $R_N$ is the degree of similarity R2, the selection processing unit outputs the arithmetic contents corresponding to the degree of similarity R2 to the SAO arithmetic operation unit 14 and the information holding unit 22.

It is expected that the accuracy of the determination of arithmetic contents can be increased with respect to learning by taking into consideration the arithmetic contents (the type of SAO and the offset value) of the SAO arithmetic operation performed, in the past, on the local decoded image of an already-encoded block, and determining the arithmetic contents (the type of SAO and the offset value) of the SAO arithmetic operation to be performed on the local decoded image after the deblocking filter process performed by the deblocking filter unit 12.

Because the similarity calculation processing unit 31 calculates the degrees of similarity $R_1, R_2, \ldots,$ and $R_N$ between the N local decoded images and the coding target block by using, for example, a simple method of calculating a degree of similarity such as sum of absolute differences (SAD), the degrees of similarity $R_1, R_2, \ldots,$ and $R_N$ can be calculated in real time.

In contrast, because the similarity calculating unit 21 uses a calculating method having a higher degree of accuracy than the method of calculating a degree of similarity used by the similarity calculation processing unit 31, but the method is a one of calculating a degree of similarity with sufficient time being provided to execute the method, the need to provide hardware for parallel processing for obtaining an improvement in the arithmetic operation speed, and so on is eliminated and enlargement of the hardware scale can be suppressed, for example.

As can be seen from the above description, because the video encoding device according to this Embodiment 1 is configured in such a way that the video encoding device includes the arithmetic contents determining unit 13 that takes into consideration the arithmetic contents of the SAO arithmetic operation performed on the local decoded image of the already-encoded block pointed to by the motion vector which is searched for through the motion-compensated prediction process performed by the motion-compensated prediction unit 4, to determine the arithmetic contents of the SAO arithmetic operation to be performed on the local decoded image after the deblocking filter process performed by the deblocking filter unit 12, and the SAO arithmetic operation unit 14 performs the SAO arithmetic operation according to the arithmetic contents determined by the arithmetic contents determining unit 13 on the local decoded image after the deblocking filter process performed by the deblocking filter unit 12, there is provided an advantage of being able to achieve downsizing of the hardware scale, and also determine optimal arithmetic contents of the SAO arithmetic operation in real time.

Although in this Embodiment 1 the example of taking into consideration the arithmetic contents of the SAO arithmetic operation performed on the local decoded image of the already-encoded block pointed to by the motion vector, to determine the arithmetic contents of the SAO arithmetic operation to be performed on the local decoded image after the deblocking filter process is shown above, the arithmetic contents determining unit can take into consideration, in addition to the arithmetic contents of the SAO arithmetic operation performed on the local decoded image of the already-encoded block pointed to by the motion vector, the arithmetic contents of the SAO arithmetic operation currently being performed on the local decoded images of already-encoded blocks existing in an area surrounding the already-encoded block (the local decoded images of four encoded blocks expressed by broken lines of FIG. 4), to determine the arithmetic contents of the SAO arithmetic operation to be performed on the local decoded image after the deblocking filter process.

In this case, the arithmetic contents determining unit specifies the same arithmetic contents as those of the SAO arithmetic operation currently being performed on the local decoded images of the already-encoded blocks existing in the surrounding area (in this case, for convenience of explanation, it is assumed that the same arithmetic contents are the arithmetic contents corresponding to the degree of similarity $R_m$ ($1 \le m \le N$)) from among the N arithmetic contents corresponding to the degrees of similarity $R_1$, $R_2$, ..., and $R_N$, and, when the degree of similarity shown by the information about the already-encoded blocks existing in the surrounding area is higher than the threshold Th, adds a positive offset to the degree of similarity $R_m$ (increases the degree of similarity $R_m$) in order to make it easy for the arithmetic contents corresponding to the degree of similarity $R_m$ to be selected from among the N arithmetic contents corresponding to the degrees of similarity $R_1$, $R_2$, ..., and $R_N$.

In contrast, when the degree of similarity shown by the information about the already-encoded blocks existing in the surrounding area is equal to or lower than the threshold Th, the arithmetic contents determining unit adds a negative offset to the degree of similarity $R_m$ (decreases the degree of similarity $R_m$) in order to make it hard for the arithmetic contents corresponding to the degree of similarity $R_m$ to be selected from among the N arithmetic contents corresponding to the degrees of similarity $R_1$, $R_2$, ..., and $R_N$.

Embodiment 2

Although in above-mentioned Embodiment 1, the example in which the selection processing unit 32 weights the degrees of similarity $R_1$, $R_2$, ..., and $R_N$ of N local decoded images and the coding target block by using the degree of similarity shown by the information about the already-encoded block pointed to by the motion vector, thereby changing the degree of easiness that the arithmetic contents shown by the information about the already-encoded block pointed to by the motion vector are selected is shown, the arithmetic contents shown by the information about the already-encoded block can be alternatively specified from among a plurality of arithmetic contents (types of SAO and offset values) which are prepared in advance, and, when the degree of similarity shown by the information about the already-encoded block is lower than a threshold Th, the arithmetic contents shown by the information about the already-encoded block can be excluded and the SAO arithmetic operation can be performed on the local decoded image after the deblocking filter process according to all the other arithmetic contents, to generate local decoded images after the SAO arithmetic operation, respectively.

In this case, because when the number of arithmetic contents prepared in advance is N, one set of arithmetic contents having a low degree of similarity is excluded, and the SAO arithmetic operation is performed according to the (N−1) arithmetic contents and (N−1) local decoded images after the SAO arithmetic operation are generated, the degree of easiness that the arithmetic contents shown by the information about the already-encoded block pointed to by the motion vector are selected is changed, like in the case of above-mentioned Embodiment 1.

In this Embodiment 2, because the number of local decoded images generated after the SAO arithmetic operation is lower than that in above-mentioned Embodiment 1, and it is not necessary to weight the degrees of similarity $R_1$, $R_2$, ..., and $R_N$ between N local decoded images and the coding target block by using the degree of similarity shown by the information about the already-encoded block pointed to by the motion vector, the amount of computation can be reduced.

Also in this Embodiment 2, in addition to the arithmetic contents of the SAO arithmetic operation performed on the local decoded image of the already-encoded block pointed to by the motion vector, the arithmetic contents of the SAO arithmetic operation currently being performed on the local decoded images of already-encoded blocks existing in an area surrounding the already-encoded block (the local decoded images of four encoded blocks expressed by broken lines of FIG. 4) can also be taken into consideration, to determine the arithmetic contents of the SAO arithmetic operation to be performed on the local decoded image after the deblocking filter process.

In this case, when the degree of similarity shown by the information about an already-encoded block existing in the surrounding area is lower than the threshold Th, the arithmetic contents shown by the information about the already-encoded block existing in the surrounding area are excluded.

Therefore, when the number of arithmetic contents prepared in advance is N, if, for example, the degrees of similarity shown by the information about four already-encoded blocks existing in the surrounding area are lower than the threshold Th, (N−4) local decoded images after the SAO arithmetic operation are generated, and the number of local decoded images generated after the SAO arithmetic operation is further decreased.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The video encoding device according to the present invention includes the arithmetic contents determinator that takes into consideration the arithmetic contents of an SAO arithmetic operation performed on a local decoded image of an already-encoded block pointed to by a motion vector which is searched for through a motion-compensated prediction process performed by a prediction image generator, to determine the arithmetic contents of an SAO arithmetic operation to be performed on a local decoded image generated by a local decoded image generator, downsizing of the hardware scale can be achieved and optimal arithmetic contents of the SAO arithmetic operation can be determined in real time, and the video encoding device is suitable for the encoding of a video signal.

EXPLANATIONS OF REFERENCE NUMERALS

1 encoding controlling unit, 2 block partitioning unit, 3 intra prediction unit, 4 motion-compensated prediction unit (prediction image generator), 5 selector, 6 subtracting unit (encoder), 7 frequency conversion/quantization unit (encoder), 8 entropy encoding unit (encoder), 9 inverse frequency conversion/inverse quantization unit (local decoded image generator), 10 adding unit (local decoded image generator), 11 local decoded image memory, 12 deblocking filter unit, 13 arithmetic contents determining unit (arithmetic contents determinator), 14 SAO arithmetic operation unit (SAO arithmetic operator), 21 similarity calculating unit, 22 information holding unit, 23 arithmetic contents selecting unit, 31 similar calculation processing unit, and 32 selection processing unit.

The invention claimed is:

1. A video encoding device comprising:
a frame memory to hold a local decoded image of an already-encoded block;
a prediction image generator to perform a motion-compensated prediction process on a coding target block by using the local decoded image held by said frame memory, to generate a prediction image of said coding target block;
an encoder to compress a difference image between said coding target block and said prediction image, and encode compressed data about said difference image;
a local decoded image generator to decompress said compressed data and decode said difference image, and generate a local decoded image from the decoded difference image and said prediction image;
an arithmetic contents determinator to take into consideration arithmetic contents of an SAO (sample adaptive offset) arithmetic operation performed on a local decoded image of an already-encoded block pointed to by a motion vector which is searched for through the motion-compensated prediction process performed by said prediction image generator, to determine arithmetic contents of an SAO arithmetic operation to be performed on the local decoded image generated by said local decoded image generator after deblocking filtering; and
an SAO arithmetic operator to perform an SAO arithmetic operation according to the arithmetic contents determined by said arithmetic contents determinator on the local decoded image generated by said local decoded image generator, and store the local decoded image after the SAO arithmetic operation in said frame memory.

2. The video encoding device according to claim 1, wherein said arithmetic contents determinator takes into consideration both the arithmetic contents of the SAO arithmetic operation performed on the local decoded image of the already-encoded block shown by the motion vector which is searched for through the motion-compensated prediction process performed by said prediction image generator, and arithmetic contents of an SAO arithmetic operation performed on a local decoded image of an already-encoded block existing in an area surrounding the already-encoded block shown by said motion vector, to determine the arithmetic contents of the SAO arithmetic operation to be performed on the local decoded image generated by said local decoded image generator.

3. The video encoding device according to claim 1, wherein said arithmetic contents determinator comprises: a similarity calculator to calculate a degree of similarity between said coding target block and the local decoded image after the SAO arithmetic operation performed by said SAO arithmetic operator; an information holder to hold, as information about an already-encoded block which is said coding target block after being encoded, both the degree of similarity calculated by said similarity calculator and the arithmetic contents of the SAO arithmetic operation performed by said SAO arithmetic operator; and an arithmetic contents selector to acquire a degree of similarity and arithmetic contents of an SAO arithmetic operation which are pieces of information about the already-encoded block shown by the motion vector, which is searched for through the motion-compensated prediction process performed by said prediction image generator, from information about already-encoded blocks held by said information holder, and, after performing a weighting process of changing a degree of easiness that the acquired arithmetic contents are selected, according to the acquired degree of similarity, select the arithmetic contents of the SAO arithmetic operation to be performed on the local decoded image generated by said local decoded image generator from among a plurality of arithmetic contents which are prepared in advance.

4. The video encoding device according to claim 3, wherein said arithmetic contents selector comprises: a similarity calculation processor to perform an SAO arithmetic operation on the local decoded image generated by said local decoded image generator according to the plurality of arithmetic contents which are prepared in advance, to generate a plurality of local decoded images after the SAO arithmetic operation, and calculate degrees of similarity between said plurality of local decoded images after the SAO arithmetic operation and said coding target block, respectively; and a selection processor to weight the degrees of similarity between the plurality of local decoded images after the SAO arithmetic operation, and the coding target block, the degrees of similarity being calculated by said similarity calculation processor, by using the degree of similarity which is the information about the already-encoded block shown by said motion vector, and select arithmetic contents corresponding to a highest degree of similarity from among arithmetic contents corresponding to the degrees of similarity which are weighted.

5. The video encoding device according to claim 4, wherein said similarity calculator calculates the degree of similarity between said coding target block and the local decoded image after the SAO arithmetic operation performed by said SAO arithmetic operator by using a method of calculating a degree of similarity having a higher degree of accuracy than the degrees of similarity calculated by said similarity calculation processor of said arithmetic contents selector.

6. A video encoding method comprising the steps of:
in a prediction image generator, performing a motion-compensated prediction process on a coding target block by using a local decoded image of an already-encoded block, the local decoded image being held by a frame memory, to generate a prediction image of said coding target block;
in an encoder, compressing a difference image between said coding target block and said prediction image, and encoding compressed data about said difference image;
in a local decoded image generator, decompressing said compressed data and decoding said difference image, and generating a local decoded image from the decoded difference image and said prediction image;
in an arithmetic contents determinator, taking into consideration arithmetic contents of an SAO arithmetic operation performed on a local decoded image of an already-encoded block pointed to by a motion vector which is searched for through said motion-compensated prediction process, to determine arithmetic contents of an SAO arithmetic operation to be performed on the local decoded image generated in said local decoded image generation processing after deblock filtering; and
in an SAO arithmetic operator, performing an SAO arithmetic operation according to the arithmetic contents determined in said arithmetic contents determination processing step on the local decoded image generated in said local decoded image generation processing step, and storing the local decoded image after the SAO arithmetic operation in said frame memory.

* * * * *